June 21, 1960  E. ROHACS  2,941,629
VALVES
Filed Dec. 5, 1955  2 Sheets-Sheet 1
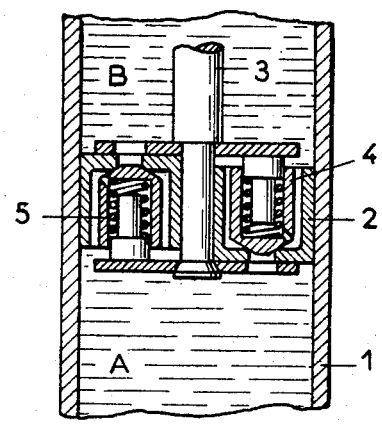
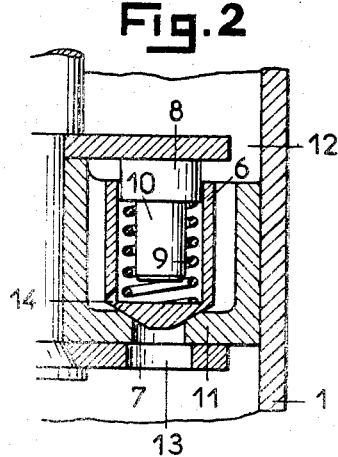 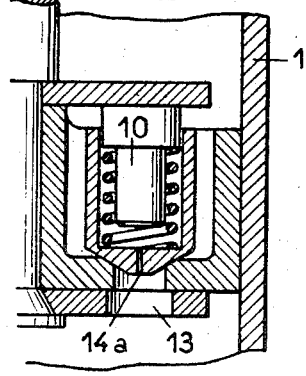
Inventor
E. Rohacs United States Patent Office 2,941,629
Patented June 21, 1960

2,941,629
VALVES

Etienne Rohacs, 56 Rue d'Eaubonne, St. Gratien, France

Filed Dec. 5, 1955, Ser. No. 551,137

Claims priority, application France Dec. 6, 1954

1 Claim. (Cl. 188—88)

This invention relates to valves, the closure member of which is subjected to an elastic pressure exerted by a spring, and more particularly to the valves employed in hydraulic shock absorbers for closing the fluid-throttling orifices when the fluid is displaced under the action of the pressure variations set up by shocks.

The invention has for its object to provide a valve which remains sensitive to movements of small amplitude taking place at high frequency, such as are produced on rippled roads or on cobbled roads and the like, and only offers a reduced compensating effort to these movements, while ensuring effective damping of the movements exceeding a certain amplitude. The object of the invention is thus to modify the damping curve while increasing the compensating force after a certain stroke of the piston of the shock absorber, which corresponds to the limit of what may be regarded as the amplitude of small oscillations, while suppressing the transmission of shocks generated at high frequency by the vibration of the wheel to the chassis.

With these objects in view, the present invention comprises a valve so designed that a delayed static compensating force is set up on the rear face of the valve.

The invention is also applicable to valves, the closure member of which is a flap, that is to say, the closure member of which is pivotally connected to a pivot pin.

A number of embodiments of the underlying idea of the invention will hereinafter be given by way of example, but it is to be understood that it is not applicant's intention to limit the generic scope of his invention to the details or specific features of the example chosen for the illustration.

In the accompanying drawings:

Figure 1 is a fragmentary axial section through the cylinder of a shock absorber provided with two valves according to the invention, Figure 2 is an enlarged section through one of the two valves of Figure 1, Figures 3, 4 and 5 are axial sections through valves according to the invention, corresponding to different embodiments.

Figure 4:
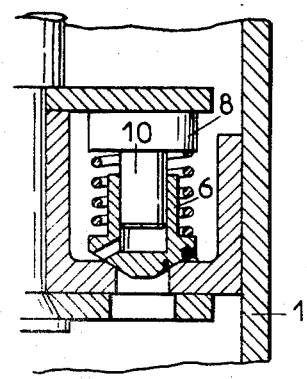

In Figure 1, A and B are the two chambers defined in the cylinder 1 of the shock absorber by the piston 2, the rod of which is designated by 3. The piston 2 comprises two similar valves 4 and 5, the valve 4 controlling the flow of the oil from A to B and forming a non-return valve in the direction from B to A, while the valve 5 controls the flow from B to A and forms a non-return valve in the direction from A to B.

In Figure 2, the valve 4 is drawn to a larger scale to explain the construction and operation thereof, in this valve, the closure member has a part 6 of cylindrical form and is terminated on the seat side by a conical or frusto-conical portion 7. The said closure member is hollow in its cylindrical portion and is guided by a cylindrical end member 8. Disposed within the closure member is the spring 9, which bears on the one hand against the bottom of the cylinder and on the other hand against the end member 8, which end member is fast with the body of the piston 2. Preferably, the end member has an extension in the form of a cylindrical portion 10 of smaller diameter which, on the one hand, serves as a support and as a guide for the spring 9 and on the other hand reduces the volume of the cavity of the cylinder. The closure member rests by its frusto-conical portion 7 on the seat 11 and is disposed in a recess of cylindrical form in the piston 2, the diameter of the said recess is greater than the external diameter of the cylinder 6 of the closure member, so that the liquid can circulate between the closure member and its recess, the said recess communicating with the chamber B through the orifice 12 and with the chamber A through the orifice 13. Finally, the cylinder of the closure member has an orifice 14 which affords communication between the internal volume of the closure member and the recess. The closure member is mounted on the end member 8 with sufficient clearance to enable the liquid penetrating through the orifice 14 to escape towards the orifice 12 and to establish pressure equality between the interior of the closure member and the chamber B when the valve is in the closed position. A second orifice could be formed in the upper part of the cylinder to facilitate this equilibrium.

Figure 3 differs from the description hereinbefore given only in that the orifice 14a, instead of affording communication between the internal volume of the closure member and the recess places the said internal volume in communication with the orifice 13. The operation is as follows:

As soon as the pressure obtaining in the chamber A and exerted on the frusto-conical portion of the closure member becomes sufficient to overcome the action of the spring 9, the valve is lifted from its seat and the flow starts from 13 to 12 without regard to orifice 14. If the orifice 14 were not formed, the effort exerted by the spring 9 on the valve element 6, 7 would be an increasing function of the stroke. Owing to the orifice 14, a counter-pressure is set up on the rear face of the valve, which to a predetermined extent counterbalances the hydrostatic pressure which has produced the lifting. Under these conditions, the resultant force exerted on the closure member undergoes an interruption, whereafter this force again becomes an increasing function of the stroke.

As a result of this arrangement, the valve will always open under low pressure, and the relative movement of the piston will only set up, at its commencement, a small compensating force, the throttling being small.

This force will remain small for relative movements of the piston at high frequency and of low amplitude, and the shocks imparted to the end of the shock absorber, which is connected with the wheel, will not be transmitted to the chassis, since the counter-pressure within the closure member cannot be instantaneously set up, but only with a certain delay.

If the relative movements of the piston are slower or have a large amplitude, the opening of the closure members will take place in the same manner at its commencement, but the counter-pressure within the closure members will thereafter be set up and, owing to the throttling which will result therefrom and which will tend to brake the movements of the liquid, the compensating forces will be freely developed.

The orifice 14 is sufficiently small to ensure that the compression is set up with sufficient delay to afford a discrimination between oscillations of small amplitude and those of large amplitude. It is obvious that in the device of Figure 3 the counter-pressure will be set up more rapidly than in the devices illustrated in Figure 2 for the same cross-sectional area of the orifices 14 and 14a.

In accordance with a modification (not shown) the orifice 14a may have a larger diameter, and a rod fast with the part 10 then passes therethrough with clearance. By this means, all danger of obstruction of the orifice 14a is avoided.

Figure 5:
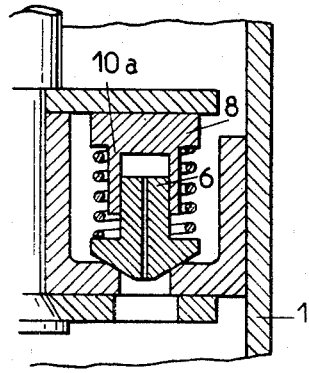

Figures 4 and 5 illustrate modifications of Figures 2 and 3 respectively, in which modifications the spring 9 is disposed outside the cylindrical portion 6 of the closure member.

In Figure 4, the closure member is guided by the cylindrical extension 10 of the end member 8, the extension acting as an internal guide, while in Figure 5 the extension 10a acts as an external guide with respect to the cylindrical portion of the closure member.

Figure 6:
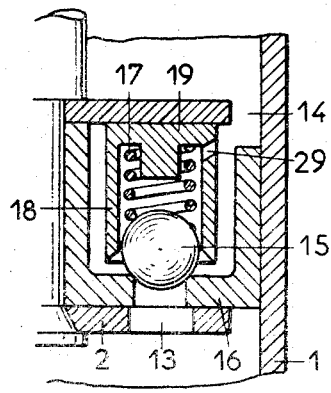
Figure 6 is an axial section through a valve, in which the closure member is a ball.

Figure 6 shows a valve, the closure member of which is a ball. The ball 15 here rests on the seat 16, against which it is maintained by the spring, 17, which is in turn disposed in a cylinder 18 open at its lower end and fast with the piston 2 at its end 19. The internal diameter of the cylinder 18 is only very slightly larger than the diameter of the ball 15, so that the very small annular cross-sectional area between the ball and the cylinder represents the orifice 14 of the foregoing examples. It is here necessary to form an additional aperture 29 in the upper part of the cylinder 18 so as to ensure pressure equilibrium with the chamber B.

The operation is here the same. It is obvious that the liquid can penetrate into the internal cavity of the cylinder 18 only after the ball 15 has been lifted and after a delay which is a function of the very small cross-sectional area already mentioned.

Figure 7:
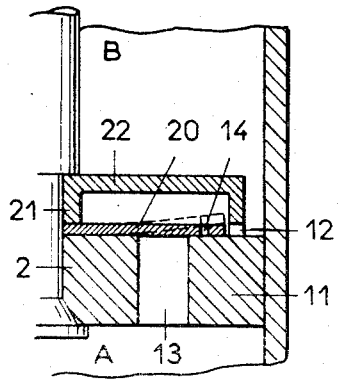
Figure 7 is an axial section through a valve according to the invention, in which the closure member is a flap.

In Figure 7, the closure member is a flap 20, which could be mounted on a hinge, but which here consists of a flexible metal blade, which is wedged on the left between the body of the piston 2 and the cheek 21 of a hollow cap 22, which cap is so dimensioned as to totally enclose the flap 20 and rests by its cheeks 21 on the seat 11. Under the action of a pressure exerted in the chamber A, the flap 20 can be slightly lifted within the cover 22, as illustrated by the dashed lines. The liquid entering through the orifice 13 can therefore escape towards the chamber B through one or more orifices such as 12 formed in the cheek 21 of the cap 22, preferably at a point diametrically opposite to the point of articulation of the flap. The flap, which may be annular and may surround the rod 3, has one or more orifices such as 14 which, in the open position illustrated by dashed lines, permit the liquid arriving through the orifice 13 to penetrate with some delay into the cavity of the cover 22 so as to exert a counter-pressure on the rear face of the flap 20. A discontinuity will thus be produced in the force exerted by the elastic flap 20 from the instant when this counter-pressure is exerted on the rear face of the flap 20.

Obviously numerous variations and modifications of the instant invention are possible in the light of the above teachings. Accordingly, it is to be understood that within the scope of the appended claim the invention may be practiced otherwise than as specifically described.

What I claim is:

In combination, an enclosed hydraulic fluid containing chamber having stationary side walls and a movable wall in sealing relation with said side walls, at least one passage through said movable wall, at least one valve in said passage to control flow of liquid through said passage from one side of said wall to the other side thereof, said valve comprising an enlarged portion of said passage, the walls of which define a valve casing, an inlet to and an outlet from said valve casing completing said passage, a seat extending around said inlet at said casing, a movable valve member in said valve casing to seat against said seat and having an inlet side facing said inlet and an outlet side facing said outlet, a spring biasing said valve member toward said seat, the surface of the outlet side of said valve member being at least as large as the surface of the inlet side as delimited by the seat, a chamber of variable volume formed by a recess in said valve member and a projection of said valve casing extending partially into said recess, a first relatively small passage means providing permanent restricted communication between said outlet and said chamber and a second somewhat less restricted passage extending from said inlet side of said valve member into said chamber out of communication with said inlet when said valve is seated, said passage means being so proportioned relative to each other as to impress in said chamber the increase of pressure on said inlet side upon movement of said valve member from said seat under hydraulic pressure to open said valve, and separate passage means from said inlet side to said outlet exteriorly of said valve member to provide for the flow of fluid from said inlet to said outlet when said valve member lifts from said seat under increased hydraulic pressure in said inlet.

References Cited in the file of this patent

UNITED STATES PATENTS

| | | |
|---|---|---|
| Re. 16,582 | Morinelli | Apr. 5, 1927 |
| 151,428 | Potter | May 26, 1874 |
| 1,994,320 | McLaughlin | Mar. 12, 1935 |
| 2,041,970 | Shepherd | May 26, 1936 |
| 2,239,112 | Nickelsen | Apr. 22, 1941 |
| 2,261,886 | Kowacz | Nov. 4, 1941 |
| 2,318,962 | Parker | May 11, 1943 |
| 2,571,279 | Myklestad | Oct. 16, 1951 |
| 2,593,522 | Barnes | Apr. 22, 1952 |
| 2,596,779 | McCoy | May 13, 1952 |

FOREIGN PATENTS

| | | |
|---|---|---|
| 400,382 | Great Britain | Oct. 26, 1933 |
| 577,825 | Great Britain | June 3, 1946 |
| 819,634 | Germany | Nov. 5, 1951 |
| 1,065,841 | France | Jan. 13, 1954 |
| 1,096,528 | France | Feb. 2, 1955 |